(12) United States Patent
Bastian et al.

(10) Patent No.: US 6,381,532 B1
(45) Date of Patent: Apr. 30, 2002

(54) QUEUED PORT DATA CONTROLLER FOR MICROPROCESSOR-BASED ENGINE CONTROL APPLICATIONS

(75) Inventors: Gary T. Bastian; Kevin M. Rishavy, both of Colorado Springs, CO (US); Martin G. Gravenstein, Nevada City, CA (US); Robert L. Anderson, Saline; Rollie M. Fisher, Trenton, both of MI (US); Raymond A. Stevens, Monument, CO (US); Samuel J. Guido, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/665,094

(22) Filed: Sep. 20, 2000

(51) Int. Cl.$^7$ .............................................. G06F 13/10
(52) U.S. Cl. ........................ 701/114; 701/115; 710/10; 710/19
(58) Field of Search ................................ 701/114, 115; 710/8–10, 15–19

(56) References Cited

U.S. PATENT DOCUMENTS 5,325,536 A    6/1994  Chang et al.
5,619,687 A  *  4/1997  Langan et al. ............... 713/502
5,671,365 A  *  9/1997  Binford et al. ............. 710/100
5,819,112 A  * 10/1998  Kusters ........................ 710/8

* cited by examiner

*Primary Examiner*—Andrew M. Dolinar
(74) *Attorney, Agent, or Firm*—John Kajander (57) ABSTRACT

An engine control system comprising a host processor in operative communication with a data bus and a plurality of peripheral devices for communicating engine operating parameters. Each of the peripheral devices include a first and second transaction register for storing communication parameters for each of the corresponding plurality of peripheral devices. The control system also includes a queued port rate register (QRR) including a memory unit in operative communication with the plurality of peripheral devices for storing data for transmission to the plurality of peripheral devices in accordance with the first and second transaction registers. The system further includes a peripheral counter in operative communication with each of the plurality of peripheral devices. The peripheral counter is adapted to interrogate each of the plurality of peripheral devices and, when data has been written to one of the peripheral devices, update the peripheral device according to the memory unit data.

14 Claims, 6 Drawing Sheets

QUEUED PORT DATA CONTROLLER FOR MICROPROCESSOR-BASED ENGINE CONTROL APPLICATIONS

BACKGROUND OF THE INVENTION

The present invention relates to engine control systems and, more particularly, to a microprocessor-based engine control system having queued control data flow between the CPU and peripheral devices.

Current microprocessor-based engine control systems must communicate with a number of peripheral data devices. In operation, data is sent to various parts of the control system through these peripheral devices. In addition, data is received and processed by the control system through these same devices. Examples of peripheral data devices include: serial peripheral interfaces (SPI), serial communications interfaces (SCI), analog-to-digital converters (A/D), and controller area networks (CAN). To facilitate data transfer among and between these devices, and to minimize overhead on the system CPU, the data is organized into lists or queues.

Present engine control system designs require that each port interface contain its own queue and queue controller. This results in an inflexible system architecture in terms of queue size and port interface design. Thus, it is difficult to modify the queue structure of the overall system in terms of the number of queues per device, size of the queue, and/or the type of queue trigger, for example.

SUMMARY OF THE INVENTION

It is an object of the invention to provide an improved queued port data controller for microprocessor-based engine control systems.

The present invention overcomes the drawbacks of these prior engine control systems through the provision of an engine control system comprising a host processor in operative communication with a data bus and a plurality of peripheral devices for communicating engine operating parameters. Each of the peripheral devices include a first and second transaction register for storing communication parameters for each of the corresponding plurality of peripheral devices. The control system also includes a queued port rate register (QRR) including a memory unit in operative communication with the plurality of peripheral devices for storing data for transmission to the plurality of peripheral devices in accordance with the first and second transaction registers. The system further includes a peripheral counter in operative communication with each of the plurality of peripheral devices. The peripheral counter is adapted to interrogate each of the plurality of peripheral devices and, when data has been written to one of the peripheral devices, update the peripheral device according to the memory unit data.

The present invention is advantageous in that it simplifies the design of each port interface and provides improved flexibility in the queue structure of the overall control system.

Another advantage of the present invention is that the size of the integrated circuit area, i.e., the die size, required for the disclosed queue controller is less than the sum of the die size for the individual queue controllers previously employed.

A further advantage is that the disclosed state machine controls the flow of data to and from the RAM and the external devices without the need for CPU intervention.

Other object and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF THE PREFERRED EMBODIMENTS

Figure 1:
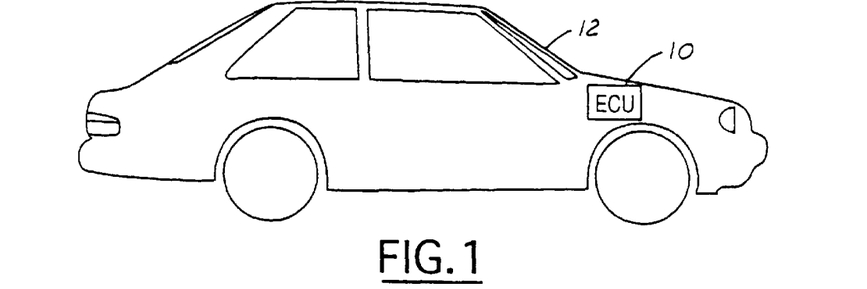
FIG. 1 is a schematic diagram of a vehicle equipped with an ECU including the queue controller of the present invention.

Referring to FIG. 1, there is shown an engine control unit (ECU) 10 with a queued port submodule in a vehicle 12 for controlling the engine operation of the vehicle 12. Among other things, the engine control unit 10 communicates with a multitude of peripheral data devices, which may be included in, for example, the automatic transmission system or the instrument cluster.

Figure 2:
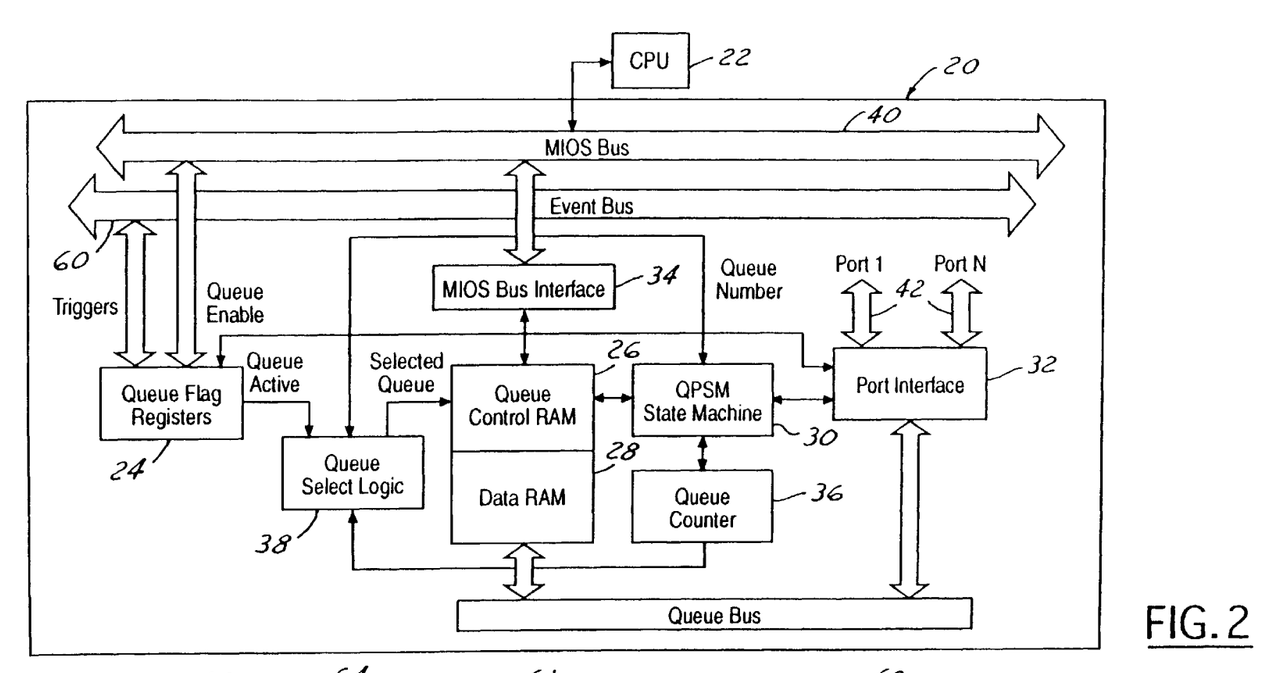
FIG. 2 is a schematic block diagram of one embodiment of the queue controller according to the present invention.

FIG. 2 shows a block diagram of the queued port serial module (QPSM) 20, which is part of the ECU 10 used to control the flow of data throughout the engine control system of the vehicle 12. The ECU 10 includes a microprocessor 22 in operative communication with the QPSM 20. The QPSM 20 primarily comprises an event controller such as queue flag registers 24, queue-control ram 26, data ram 28, a QPSM state machine 30, and a port interface 32. In addition, the QPSM 20 includes a Peak Internal Bus system (PIBS) interface 34, a queue counter 36, and queue select logic 38.

The QPSM state machine 30 is a flexible queued interface between the dedicated RAM 28 and a variable number of I/O ports shown in FIG. 2 as port 1 through port N. The state machine 30 controls the flow of data to and from RAM 28 and the external devices without the need for CPU intervention.

Each port 42 can have a variable number of queues associated with it such as, for example, 16. Data values to be transferred to the ports 42 are stored in RAM 28 by the host CPU 22 via the PIBS bus 40. Data transferred from the ports 42 is stored in RAM 28. The number of ports 42 and queues associated with each port 42 is selected at the time of chip fabrication. Each QPSM queue can be independently triggered by a service request from either a port 42 or the host CPU 22, and has its own queue control block. This allows for both read and write transfers of variable size such as 8, 16, 24, or 32 bits. There is a trigger for each queue with programmable priority. Multiple modes of operation are also possible for each peripheral device including: round-robin, priority, and pre-emptive modes of operation.

An important aspect of the QPSM 20 is the QPSM state machine 30 and its dedicated RAM 26, 28. The RAM contains both the control data for the state machine 30 and the data to be transmitted to, or received from, the ports 42. The operation of the state machine 30 and the RAM 26, 28, will be described in further detail below. The submodules of the QPSM 20 will now be described in detail.

The port interface 32 includes a port counter which cycles continuously between all of the ports 42 that have been implemented. As the queue counter passes each port 42 in ascending order, the QPSM state machine 30 checks to see if service is requested on that port. Both read and write transfers between the port interface 32 and the data RAM 28 can be of variable word size. For example, the port interface 32 can be selected to have a one-cycle sixteen-bit interface. If there are 16 ports 42 having up to 16 queues associated with each port, then only 16 bytes of data can be addressed in each port 42. Thus, only a three-bit address field is required. Each port 42 is selected with a port select signal that is active for only one port at a time. In addition, the read and write buses are preferably separated. In this example, each port 42 has an sixteen-bit read bus, and all of these buses are multiplexed together. The ports 42 can be accessed by the QPSM state machine 30 or the PIBS bus 40 to move data to and from the queue control RAM 26. Because the read commands to the ports are sixteen-bits at a time, either an eight-bit value or a sixteen-bit value can be read in a single cycle. Multiple cycles are needed to move words of data. When either the PIBS bus 40 or the QPSM state machine 30 moves a word of data to or from the ports 42, coherency is maintained by performing the transfer without releasing the bus.

Port interface 32 preferably also receives three control signals from the ports 42. These signals are SP_service (the port needs servicing), SP_concat (a concatenated port operation is in progress, therefore don't change the queues), and SP_pause (the port requests to pause the queue). These control signals are preferably individual wires from each port 42 which are multiplexed together within the QPSM 20.

The PIBS bus interface 34 will now be described with reference to FIG. 2. In this example, the QPSM 20 uses a 32-bit PIBS bus interface 34. As mentioned above, all word transfers within the system are coherent. The RAM 28 has a delay of one clock cycle on read commands but no delay on write commands. However, reads to the ports 42 require a two-clock cycle delay due to the sixteen-bit port interface 32. Byte and half-word write commands to the ports 42 are delayed one clock cycle. Word read and writes are not supported to the ports. All other registers read and write without any delay. These timing parameters are controlled by the QPSM state machine 20. Since the QPSM 20 uses a 32-bit PIBS bus interface byte, half-word, and word read commands all require the same timing. Table 1 summarizes the cycle delays associated with the PIBS bus interface 34. Of course, these delays are merely illustrative of the delays associated with the disclosed architecture. Depending upon the port and queue configuration, these delays can be different.

TABLE 1

MIOS Bus Read/Write Delays

| Type of Transfer | Delay (in cycles) |
| --- | --- |
| Read from a non port register location | 0 |
| Read from a RAM location | 1 |
| Read from a port location | 2 |
| Write to a non port registration location | 0 |
| Write to a RAM location | 0 |
| Halfword or byte write to a port location | 1 |

The queued control RAM 26 will now be described with reference to FIG. 2. The queue control RAM 26 holds the contents of the first queue control word (QCW) during the operation on each port 42. The QCW loaded into the queue control RAM 26 is based on the port number and the active queue number. During transfers, the queue control RAM counter counts the number of data moves and transmits this information to the QPSM state machine 30 so that the state machine 30 can appropriately advance state. At the end of a transfer, or when the queue is changed, the QPSM state machine 30 loads the data back into the RAM 26 at the same location it came from. At the end of the queue and during restarts, the second QCW is loaded into the queue control RAM 26 for one cycle until it can be saved back into the first QCW.

The queue control RAM 26 stores the QCWs and the data input and output by the queues. The RAM 26, 28 has no hard upper boundary between QCWs and the data. The QCWs are stored beginning at the bottom address of the RAM 26, 28. In this example, each QCW occupies eight byte locations. The QCWs are stored in consecutive locations, first by port number, and then by queue number. Unused locations in RAM may be used by the host CPU 22 for other data.

Figure 3:
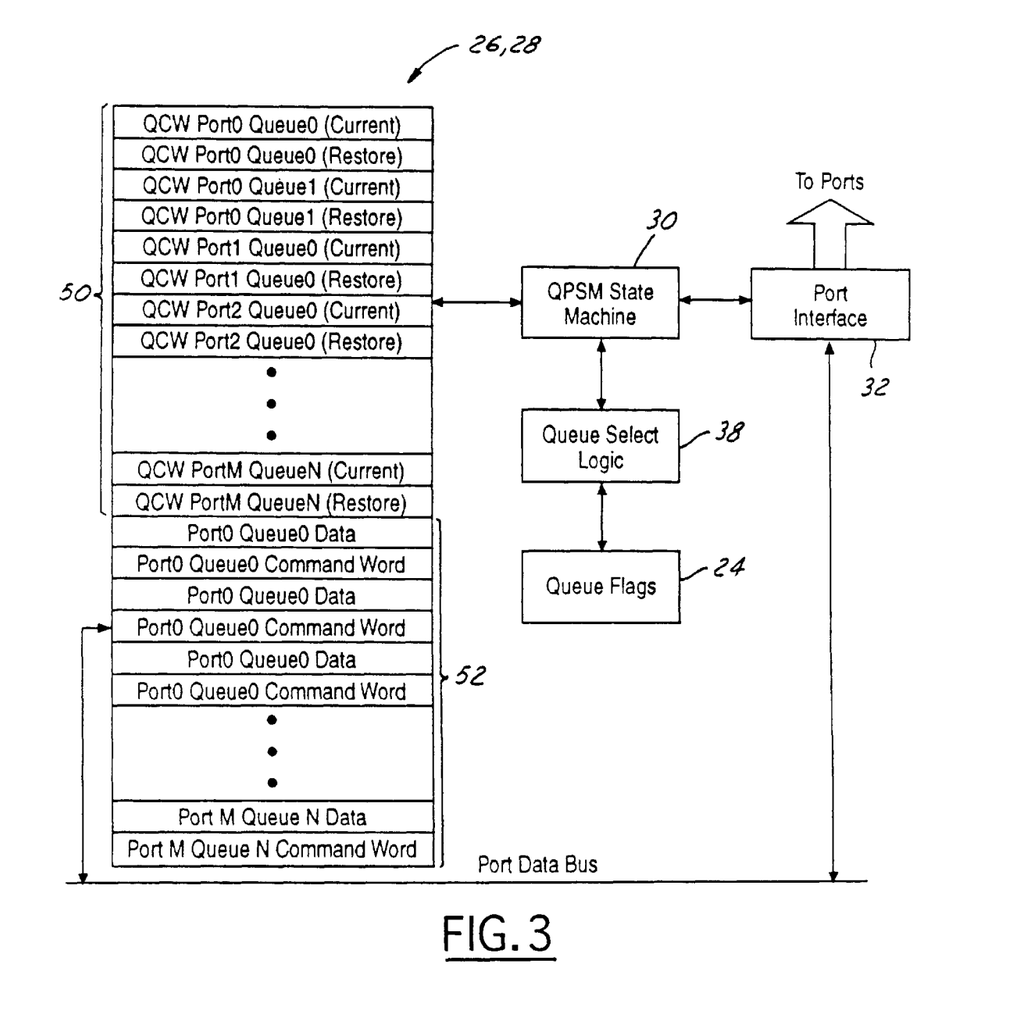
FIG. 3 is a schematic diagram of the QPSM memory of FIG. 2.

FIG. 3 shows the organization of the queue control RAM 26 and data RAM 28. As shown in FIG. 3, the RAM area consists of two parts: one for storing QCW words for each port and queue, and the other for storing port data and port command words. For each queue within every port 42, there is a pair of QCWs that control the flow of data to and from the port 42. As stated above, the use of two identical QCWs allows for reloading of the initial QCW when each queue completes or is interrupted and must be reset to the initial value when restarting from the top of the queue. This group of words is located at the upper end 50 of the RAM area. The lower portion 52 of the RAM area contains the port transmit/receive words and command word of each data block to be sent or received.

In operation, the queue flags 24 determine which queues are to be activated. The next queue to be activated is determined by the queue select logic 38, which forms a QCW pointer from the current queue and port numbers. The next queue is selected based on the current queue number, which queue is active, and the type of queue (round-robin, priority, or pre-emptive). The QPSM state machine 30 uses the current CW to transfer the correct number of queue words to or from the port using the preset number of read and write cycles.

Referring again to FIG. 2, the queue flag registers 24 will now be described. The queue flag registers 24 are essentially a software programmable selection matrix that direct any one of 16 triggers to any one of 16 queue trigger inputs. Each port 42 associated with the QPSM 20 has a set of flags. In this case, the flags are ENABLE, ACTIVE, DONE, ERROR, and FIRST-TIME. The number of queues and the number of event triggers assigned to each port 42 affect the number of flags each of these modules contain. For each queue assigned to a port 42, there is one flip-flop for each of the above-mentioned flags. In this case, each port 42 may have up to 16 queues. In addition, all of the flags except the FIRST-TIME flag are controllable and readable by the host CPU 22.

The QPSM flags are set by writing a "1" into the bit at the appropriate set address. The flags are cleared by writing a "1" into the bit at the appropriate clear address. The ENABLE bit is controlled only by host writes and is used to allow the queue to be activated by a trigger. In addition to control by the host CPU 22, the ACTIVE bit is set by an event trigger while the ENABLE bit is set. The ACTIVE bit is cleared by either a pause or by the completion of the queue. In addition to control by the host, the DONE bit is set by the completion of the queue. The DONE bit cannot be cleared by the hardware. In addition to control by the host, the ERROR bit is set by receiving a trigger while the ACTIVE bit is set. The ERROR bit also cannot be reset by the hardware. Preferably, in all cases, if the host writes both a set and a clear to the same bit at the same time, the clear takes precedence. Also, preferably in all cases, writes from the host takes precedence over hardware events occurring at the same time. The FIRST-TIME bit is controlled only by the hardware. It is set when the ACTIVE bit is first set, and cleared when the queue is serviced for the first time. This bit tells the QPSM state machine 30 to skip the read portion of the cycle on the first data transfer of the queue.

Referring to FIG. 2, the queue select logic 38 will now be described. The queue select logic 38 determines the next queue to be processed. The current queue number and the active bits and the queue type are used to determine the next queue. The queue select logic 38 provides for multiple modes of operation for each device including round-robin, priority, priority-interruptible, and simple. In the round-robin mode, each queue takes turns by queue number order after each possible break in the data transfers. In the priority mode, the highest priority queue is serviced when the current queue finishes. In the priority-interruptible mode, the highest priority queue is served as soon as possible after it becomes active. In this mode, lower priority queues will be suspended when a higher priority queue becomes active. If the RESTART bit has been set on the lower priority queue, they will start again at the beginning when it is allowed to continue. Finally, in the simple, or slave mode, only the first queue can be active. This queue will move data until complete and cycles if the wrap bit is set.

The QPSM state machine 30 will now be described with reference to FIG. 2. The QPSM state machine 30 controls queued transfers between the RAM 28 and the ports 42. The port counter of the port interface 32 continuously cycles through the ports that have been implemented. As each port 52 becomes active, the QPSM state machine 30 checks the SP_service bit and the active flags for that port to determine if service is required. If service is required, the QPSM state machine 30 runs through its states to remove data to and from the port 42 and start the port again. The basic logic functions of the state machine 30 are write, wait for port service, test for new queue, and read. These are implemented as READ, TEST, WRITE, and WAIT with an additional bit per queue called FIRST-TIME. As mentioned above, the FIRST-TIME bit directs the state machine 30 to ignore the READ command and the TEST command the first time the queue is started.

The QPSM 20 will now be described with reference to FIG. 2. The QPSM state machine controls the flow of data to and from the RAM 28 and the ports 42 without the need for intervention by the CPU 22. As mentioned above, data is stored in the RAM 28 and can be arranged in a flexible number of data queues such as 16, for each port 42. Each data queue can be independently triggered and has its own queue control block that allows for both read and write transfers of variable word size, i.e., 8, 16, 24, or 32 bits. There is a trigger for each queue with programmable priority for each port device. As shown in FIG. 2, each of the queues is triggered by events received from the system even bus 60. The event control and flag registers 24 determine which queue is triggered next. The next queue is selected based upon the current queue number, the currently active queue and the type of queue (simple, priority, round robin, or priority interrupt). The QPSM state machine 30 can be further programmed to provide submodes of operation, such as wrapping, pause, and restart.

Figure 4:
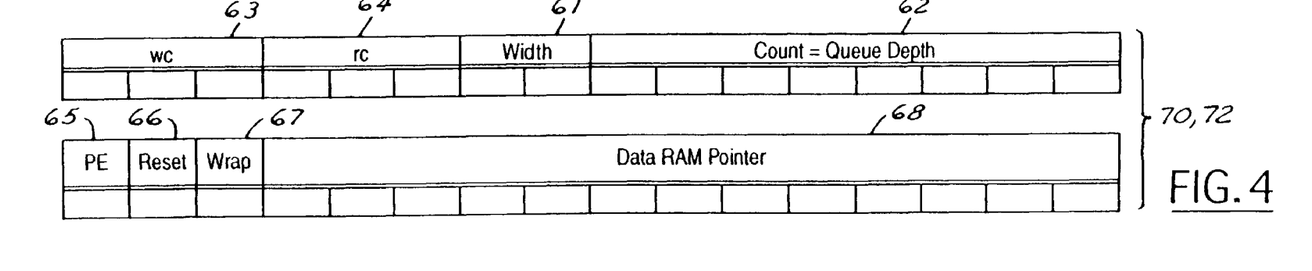
FIG. 4 is a schematic diagram of the queue control word format for the QPSM of FIG. 2.

Control of the data flow for each port 42 and each queue in that port is governed by the queue control word (QCW). FIG. 4 shows the format of the QCWs. There are two identical QCWs, 70, 72. The second control word is for restoring the values in the first control word when the queue recycles. The QCW determines, for each transfer, the number of write cycles 63 and read cycles 64 per transfer. There is a data field width 63 to adjust the data transfer which depends upon the data size (i.e., byte, half-word, or word), to allow transfer of full word memory boundaries. The count field 62 is set equal to the total number of words in the queue to be transferred. When the count equals zero, the queue either stops or recycles to the top. In addition, there are three one-bit fields which enable the PAUSE 65, RESET 66, and WRAP 67 functions. A 13-bit data pointer 68 indicates the starting address of the queue data in the data RAM 28.

Some of the fields are changed automatically as the data transfer occurs. The Count 62, write count 63, and read count 64 are decremented, and the data pointer is incremented.

The second QCW is identical to the first, except that the values do not change during queue operation. The purpose of the second QCW is to retain the initial values of the first QCW. Values from the second QCW are automatically loaded into the first QCW whenever the queue is restarted.

The Pause Enable (PE) bit 66 allows the hardware in the SPI port to pause the queue. When a queue is paused, the active bit is reset and the queue remains in the same state. The queue restarts when another trigger event is received. The Wrap bit 67 allows the queue to run continuously. When the queue completes its cycle, the done bit is set, but the active bit also remains set. The queue continues to cycle until it is stopped by the processor. The Restart bit 65 specifies that the queue start at the beginning after being interrupted such as by another queue.

The use of queue control words to determine the various aspects of an individual queue allows the system to link or append another queue onto the end of an existing queue. Specifically, there are two identical QCWs 70, 72 for each queue. One is the working QCW 70 where the fields increment/decrement as the SPI port is being written to, to track the progress of the queue. The other QCW 72 is the holding queue that contains the initial settings for that queue. When the queue recycles, the holding values are reloaded into the working QCW. The queues can be linked if the QCW is written to by one of the host processors. The host processor can change the pointer field 68 to point to the top of a different queue. Before the reload occurs, the queue would automatically start at the top of a new queue when the present queue finished processing. Later, the QCW would be restored to its original value by the host CPU. In this way, several data queues can be linked together to provide additional flexibility.

Another advantage of the QCW is the ability to accommodate various types of ports. Because the QCW can designate the number of read and write cycles, and the data word size, the QPSM can be interfaced to several types of port configurations. For example, the memory map for each port type such as A/D converter, serial communication interface, a serial peripheral interface is different in the number and location of data command words. By programming the corresponding number of read cycles and write cycles into the QCW, the QPSM can interface with these various port designs.

Furthermore, because the QCW determines the number of word read and write cycles for a given port design, the QPSM can interface with other port designs by reconfiguring the QCW. Specifically, the size of the data fields can be modified. For example, the read count register 64 and write count register 63 can be each increased from three bits to four, provided that the other data fields be correspondingly decreased by a total of two bits.

Figure 5:
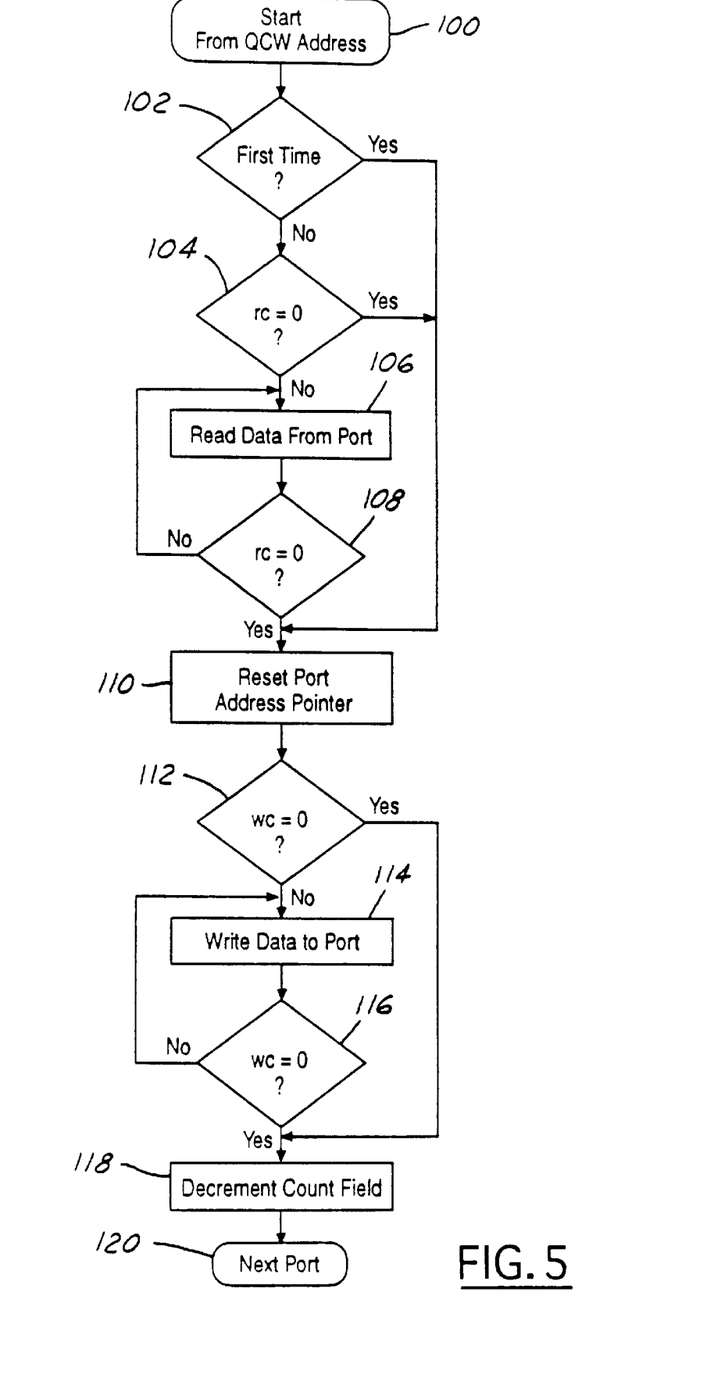
FIG. 5 is a logic flow diagram describing the operation of the queued port submodule of FIG. 2.

Referring to FIG. 5, the logic flow of the QPSM state machine 30 operation will now be described. When a queue becomes active, the pointer to the QCW is formed from the port number and the queue number at block 100. The first QCW is loaded into the state machine 30 and establishes the number of data words to be read and written to the port 42. If the queue is being activated for the FIRST-TIME (block 102) or if the number of read cycles is equal to zero (block 104), the read operation (step 106) is omitted. Otherwise, if the read cycle counter is not zero, data is read from the port 42 (step 106) and placed into the data RAM 28 at the address indicated by the 13-bit data RAM pointer. The number of 8-bit byte reads (step 108) is determined by the value of the read cycle counter, i.e., 0–7.

After the read operation, the port is written to, and the number of bytes written is equal to the value in the write cycle counter (0–7). Before the write operation, however, the port address pointer is reset to the top of the port memory map at step 110. When writing is complete (steps 112, 114, 116), the count field which indicates the queue depth is decremented by one (step 118) and the controller services a queue in another active port (step 120). When the port counter returns again to this port and queue, reads and writes will occur as described above, and the count field will be decremented by one for each read/write cycle. When the count equals zero, the queue will either stop, or recycle to the top.

Figure 6:
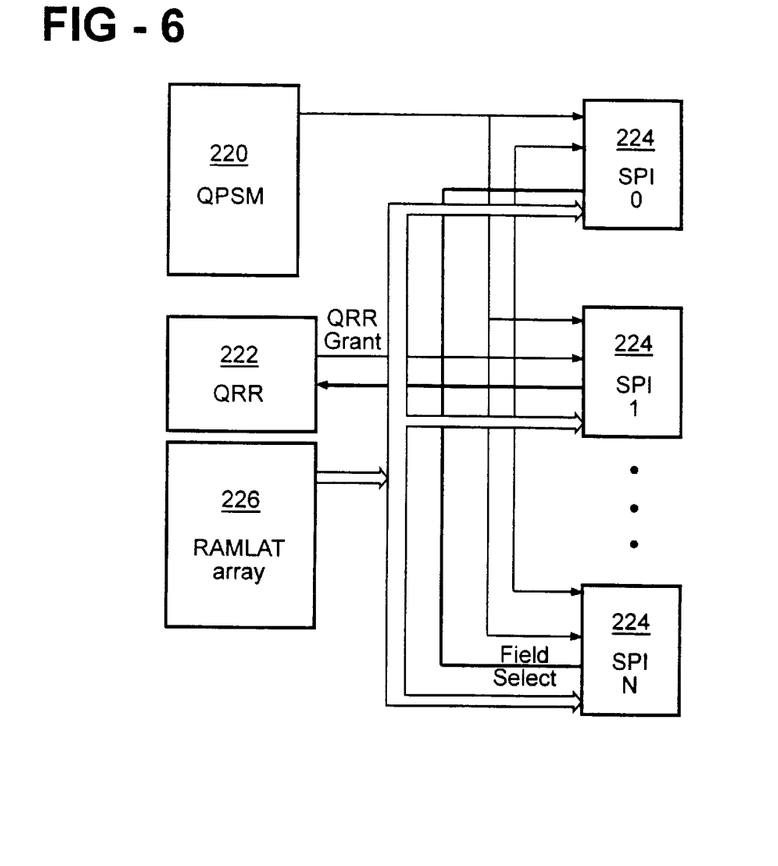
FIG. 6 is a block diagram of a queued port rate register (QRR) in a communication environment according to the present invention.

FIG. 6 shows a block diagram of a queued port rate register (QRR) in a communication environment. For some applications, a serial port interface (SPI) port may need to communicate with devices that require changing the communication parameters such as baud rate, delay before transmit (DBT), delay after transmit (DAT), etc., for each device. As explained above, the QPSM 220 can accomplish this task. However, the QRR subsystem 222 shown in FIG. 6 is a more efficient mechanism for sending such parameters to each SPI port than the QPSM 220. As compared to the QPSM 220, the QRR 222 has a reduced number of interconnect wires and reduced size.

Figure 7:
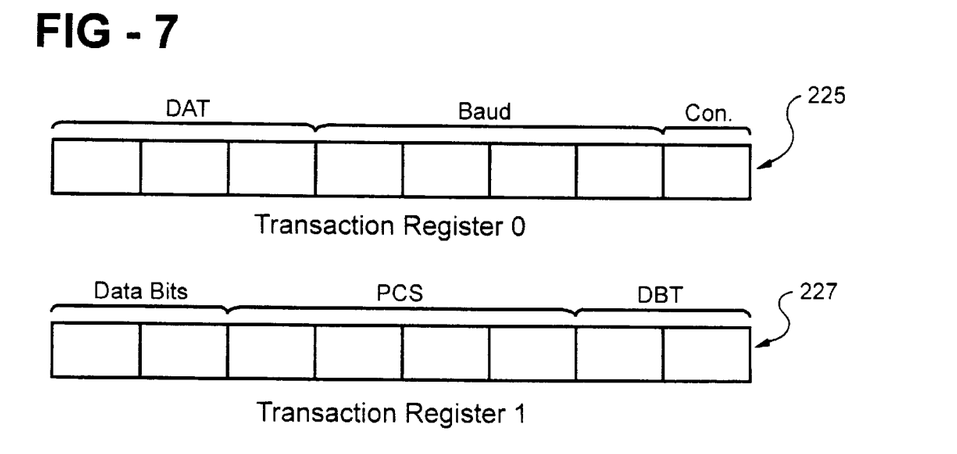
FIG. 7 is a schematic diagram of the QRR transaction registers.

The QRR 222 can service any number of serial peripheral interface (SPI) ports 224. In operation, the QPSM 220 initially loads each SPI port 224 with the desired transmitted data and two "transaction registers." The structure of the transaction registers are shown in FIG. 7. The transaction registers specify the communication parameters associated with the data. For example, transaction register zero 225 specifies the DATS (3 bits), BAUDS (4 bits) and Concatenate (1 bit). Transaction register one 227 specifies the number of data bits (2 bits), Peripheral Chip Selects (4 bits) and DBT (2 bits). The DATS, BAUDS, BITSEL and DBTS are not the actual values required by the corresponding SPI, but are pointers or indices to values stored in the QRR 222. The Concatenate and PCS fields are the actual values used by the corresponding SPI.

The concatenation bit in transaction register zero 225, when set, allows the concatenation of words to permit transfer of bits greater than 32 as one single word. This bit is connected to the QPSM logic, such that, when set, the associated chip select signal is not de-asserted after the transfer. In addition, when the concatenation bit is set, the QPSM state machine preserves the write counter and pointer information in the case of an interrupt or queue switching, so that the order of the data transfer is preserved.

Figure 8:
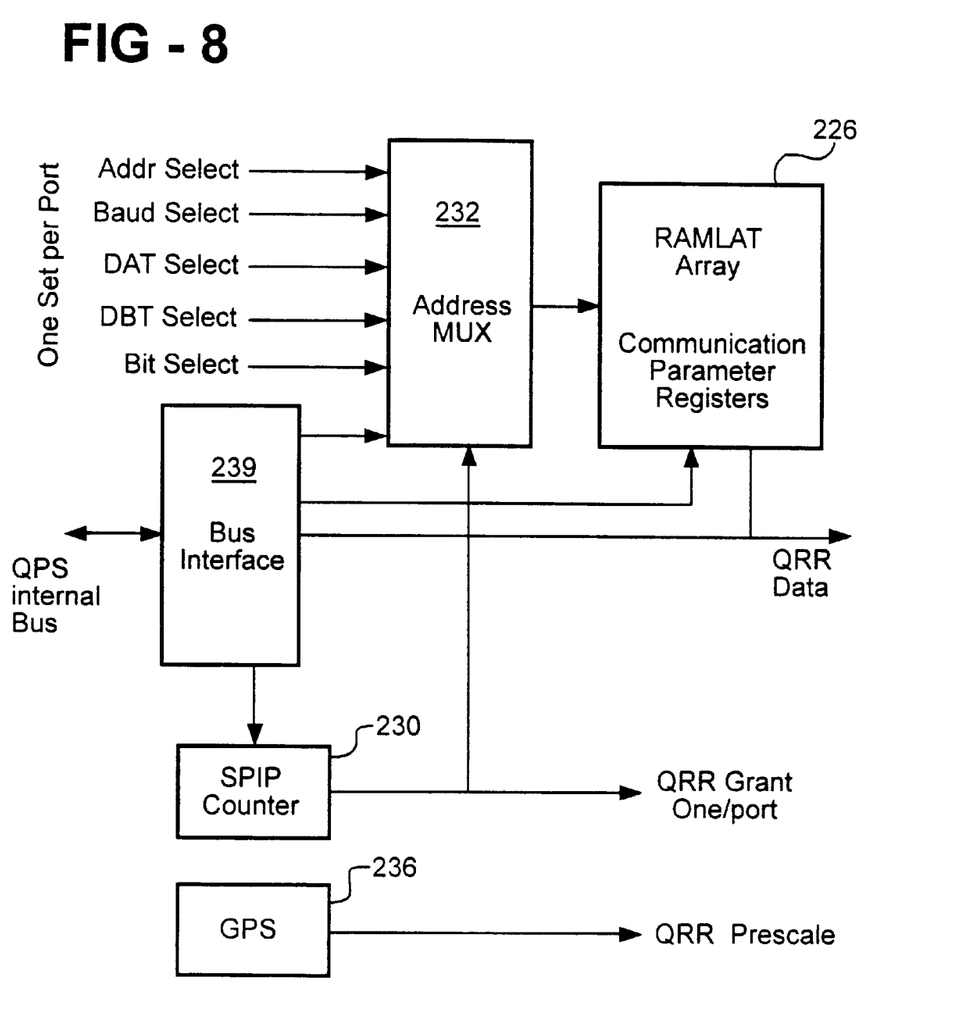
FIG. 8 is a block diagram of a queued port rate register (QRR) according to the present invention.

FIG. 8 is a block diagram of the QRR logic. The QRR includes a SPI port counter 230 whose modulo is equal to the number of SPI ports. The QRR also includes a multiplexer 232, bus interface 234, and a global pre-scale (GPS) register 236. The GPS 236 holds the values for all SPI port baud rates, DBT counts, DAT counts, and number of bits to be transferred. The GPS is written upon start-up by the host CPU.

The counter generates a series of "grant" signals that interrogate each SPI port, in turn, in a rotating continuous manner. If new data has been written to a particular SPI port, the SPI port will then request data from the QRR to update its communication parameters.

Only one word of the RAMLAT array 226 is accessed at a time, so the QRR shares the data on a time slot basis. The fields Address Select, Baud Select, DAT Select, DBT Select, and Bit Select determine, through the address MUX 232, which data will be sent to the requesting SPI port. If one of the hosts requests data from the QRR, the SPIP counter 230 is held for one clock cycle before servicing the next SPI port.

Figure 9:
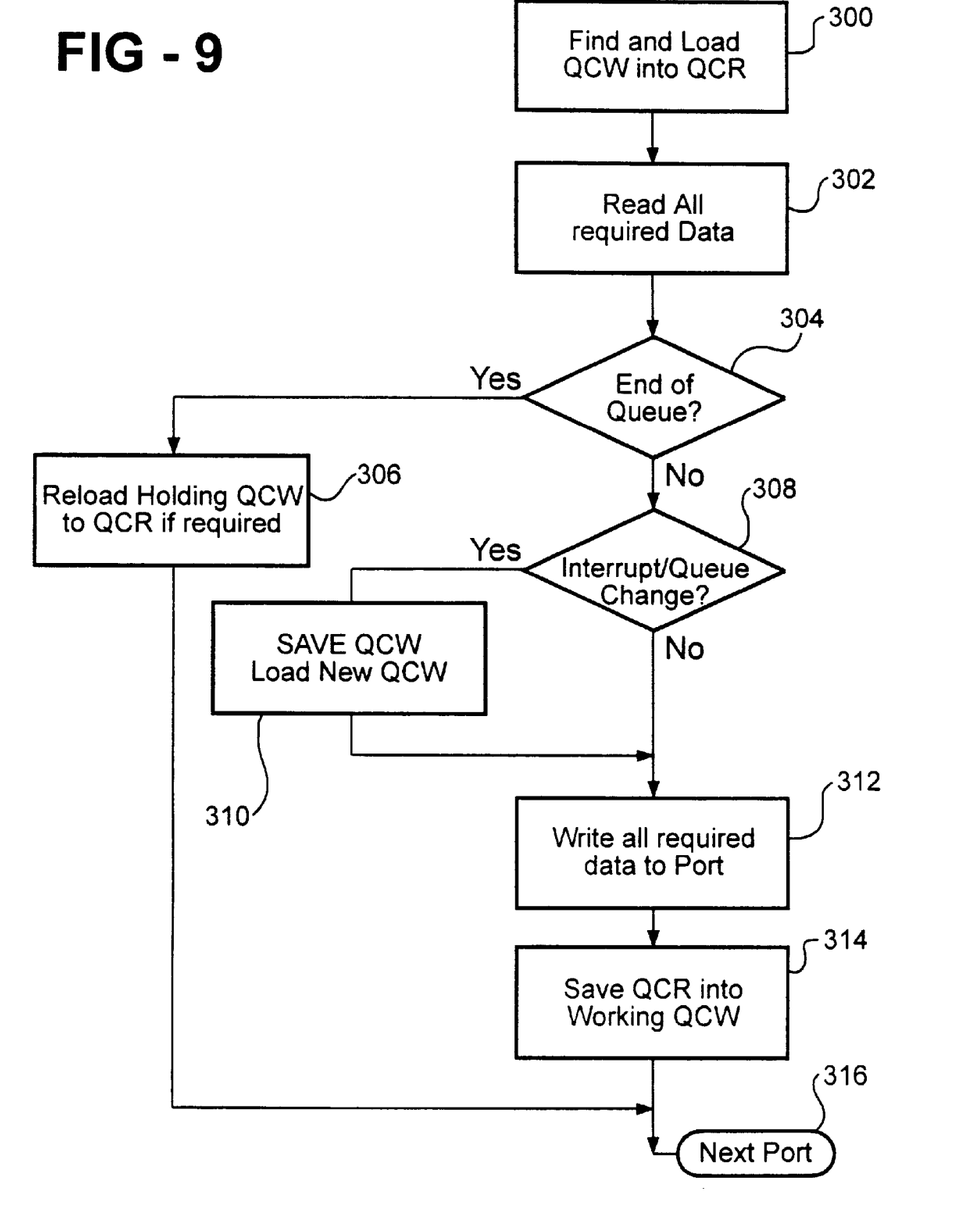
FIG. 9 is a logic flow diagram of a write wait routine according to the present invention.

Referring now to FIG. 9, there is shown a logic flow diagram of a write-wait routine executed by the QPSM state machine 30 (FIG. 2) which allows the system to change queues without corrupting the data flow. The logic begins when a port is serviced by locating and loading the corresponding QCW into the queue control RAM register (QCR) as shown in step 300. The corresponding data is read in step 302. If the end of the queue has been reached (step 304), the holding QCW is reloaded into the QCR (step 306). If the QPSM is set up for linked operation, however, the holding QCR may be reloaded at a later time by the host CPU. If the end of the queue has not been reached, the routine tests for an interrupt or queue change in step 308. In the event of an interrupt or queue change, the current queue's QCW is saved to the Queue Control RAM 26 and the new queue's QCW is loaded from the Queue Control RAM 26 in step 310. The logic then continues to step 312 where the data is transferred to the port. In step 314, the QCR is saved into the working QCW to restore the original process prior to the interrupt or queue change. The logic then continues in step 316 to service the next port.

From the foregoing, it will be seen that there has been brought to the art a new and improved data transfer scheme for engine control systems. The described queue controller has a flexible design.

While the invention has been described in connection with one or more embodiments, it will be understood that the invention is not limited to those embodiments. On the contrary, the invention covers all alternatives, modifications, and equivalents as may be included within the spirit and scope of the appended claims.

What is claimed is:

1. A queued port rate register (QRR) system supporting a host processor, said QRR system comprising:

a plurality of peripheral devices, each of said peripheral devices having a first memory unit having a first and second transaction register for storing communication parameters for each of said corresponding plurality of peripheral devices;

a second memory unit in operative communication with said plurality of peripheral devices for storing data for transmission to said plurality of peripheral devices in accordance with said first and second transaction registers; and a peripheral counter in operative communication with each of said plurality of peripheral devices, said peripheral counter adapted to interrogate each of said plurality of peripheral devices and, when data has been written to one of said peripheral devices, update said peripheral device according to said second memory unit data.

2. The QRR system according to claim 1 wherein said first transaction register comprises a delay-after-transmit (DAT) field, a Baud field, and a Concatenate field.

3. The QRR system according to claim 1 wherein said second transaction register comprises a delay-before-transmit (DBT) field, a Data Bit field, and a Peripheral Chip Select field.

4. The QRR system according to claim 1 further comprising an address multiplexor in operative communication between said second memory unit and said peripheral counter for receiving said first and second transaction register communication parameters and pointing to a corresponding location in said second memory unit to enable said data transmission.

5. The QRR system according to claim 4 further comprising a queued port submodule (QSPM) in operative communication with each of said plurality of peripheral devices for initializing each of said first and second transaction registers associated with each of said plurality of peripheral devices.

6. An engine control system comprising:

a host processor in operative communication with a data bus;

a plurality of peripheral devices for communicating engine operating parameters, each of said peripheral devices having a first and second transaction register for storing communication parameters for each of said corresponding plurality of peripheral devices; and, a queued port rate register (QRR) including a memory unit in operative communication with said plurality of peripheral devices for storing data for transmission to said plurality of peripheral devices in accordance with said first and second transaction registers; and a peripheral counter in operative communication with each of said plurality of peripheral devices, said peripheral counter adapted to interrogate each of said plurality of peripheral devices and, when data has been written to one of said peripheral devices, update said peripheral device according to said memory unit data.

7. The engine control system of claim 6 wherein said first transaction register comprises a delay-after-transmit (DAT) field, a Baud field, and a Concatenate field.

8. The engine control system of claim 6 wherein said second transaction register comprises a delay-before-transmit (DBT) field, a Data Bit field, and a Peripheral Chip Select field.

9. The engine control system of claim 6 further comprising an address multiplexor in operative communication between said memory unit and said peripheral counter for receiving said first and second transaction register communication parameters and pointing to a corresponding location in said memory unit to enable said data transmission.

10. The engine control system of claim 9 further comprising a queued port submodule (QSPM) in operative communication with each of said plurality of peripheral devices for initializing each of said first and second transaction registers associated with each of said plurality of peripheral devices.

11. The engine control system of claim 6 wherein said peripheral counter is adapted to serially interrogate each of said peripheral devices.

12. A method of controlling data flow in an engine control system comprising a host processor, a plurality of peripheral data devices, each of said peripheral data devices having a first and second transaction register for storing communication parameters, and a queue control unit including associated memory having a first portion for storing queue control commands associated with each peripheral device and a second portion for storing peripheral device data, the method comprising the steps of:

receiving an event trigger indicative of a desired data transfer between said host processor and at least one selected peripheral device;

loading a queue control command into said queue control unit from said first memory portion associated with said selected peripheral device;

transmitting all data associated with said selected peripheral device to said host processor;

detecting an interrupt event;

storing said peripheral device data of said second portion associated with said selected peripheral device; and servicing said interrupt event.

13. The method of claim 12 wherein said step of detecting an interrupt event includes the step of detecting an interrupt event from another peripheral device, and said step of servicing said interrupt event includes transmitting all data associated with said interrupting peripheral device to said host processor.

14. The method of claim 13 further comprising the step of, after servicing said interrupt event, restoring said stored peripheral device data of said second portion associated with said selected peripheral device.

* * * * *